United States Patent [19]

Gates

[11] Patent Number: 5,263,361
[45] Date of Patent: Nov. 23, 1993

[54] APPARATUS FOR LEAK TESTING A FLUID CONTAINING CHAMBER UTILIZING A LASER BEAM

[76] Inventor: Donald C. Gates, 4155 Cypress, Troy, Mich. 48098

[21] Appl. No.: 448,739

[22] Filed: Dec. 11, 1989

Related U.S. Application Data

[63] Continuation-in-part of Ser. No. 338,622, Apr. 17, 1989, Pat. No. 4,924,694, which is a continuation-in-part of Ser. No. 234,805, Aug. 22, 1988, Pat. No. 4,854,158.

[51] Int. Cl.$^5$ .............................................. G01M 3/06
[52] U.S. Cl. ..................................... 73/45.5; 73/41.4
[58] Field of Search ............... 73/41.2, 45.8, 49.2 R, 73/45.5

[56] References Cited

U.S. PATENT DOCUMENTS

| | | |
|---|---|---|
| 2,408,202 | 9/1946 | Dickman . |
| 3,516,284 | 6/1970 | Lockard .................... 73/45.5 |
| 3,590,256 | 6/1971 | Neeff ......................... 73/45.5 |
| 4,328,441 | 5/1982 | Kroeger, Jr. et al. ........ 310/319 |
| 4,616,503 | 10/1986 | Plungis et al. ............... 73/55 |
| 4,633,123 | 12/1986 | Radice ....................... 310/339 |
| 4,638,207 | 1/1987 | Radice ....................... 310/328 |
| 4,686,850 | 8/1987 | Evans ......................... 73/45.5 |
| 4,854,158 | 8/1989 | Gates ......................... 73/45.5 |
| 4,903,524 | 2/1990 | Kataoka et al. ............. 73/45.5 |
| 4,924,694 | 5/1989 | Gates ......................... 73/45.5 |

FOREIGN PATENT DOCUMENTS

| | | |
|---|---|---|
| 1471239 | 3/1967 | France . |
| 76435 | 5/1982 | Japan ......................... 73/45.5 |
| 145430 | 7/1986 | Japan . |
| 122927 | 5/1988 | Japan ......................... 73/45.5 |
| 143929 | 6/1989 | Japan . |
| 145541 | 6/1989 | Japan . |
| 796680 | 1/1981 | U.S.S.R. ..................... 73/45.5 |
| 977967 | 11/1982 | U.S.S.R. . |

*Primary Examiner*—Hezron E. Williams
*Assistant Examiner*—Joseph W. Roskos

[57] ABSTRACT

A method and apparatus for leak testing a fluid containing chamber wherein the chamber is pressurized with a gas and is submerged in a liquid. The bubbles of gas rising from the submerged chamber are directed past a plurality of a predetermined locations that are each in optical communication with a photoelectric detector. The signals from the detectors are counted and when the number of bubbles exceeds a predetermined number, a signal is activated indicating a leaking container. By grouping a number of adjacent photoelectric detectors into a predetermined set, the apparatus can discriminate between random bubbles rising from the chamber surface as it is submerged and a number of bubbles all originating from a given location indicating a leak. The photoelectric detectors may be positioned in the liquid adjacent the predetermined locations or positioned out of the liquid and coupled to the predetermined locations by fiber optic cables. Alternatively, a laser beam can be directed across the predetermined location and received by a detector on the opposite side of the laser source. When a bubble interrupts the laser beam, a signal is generated.

25 Claims, 8 Drawing Sheets

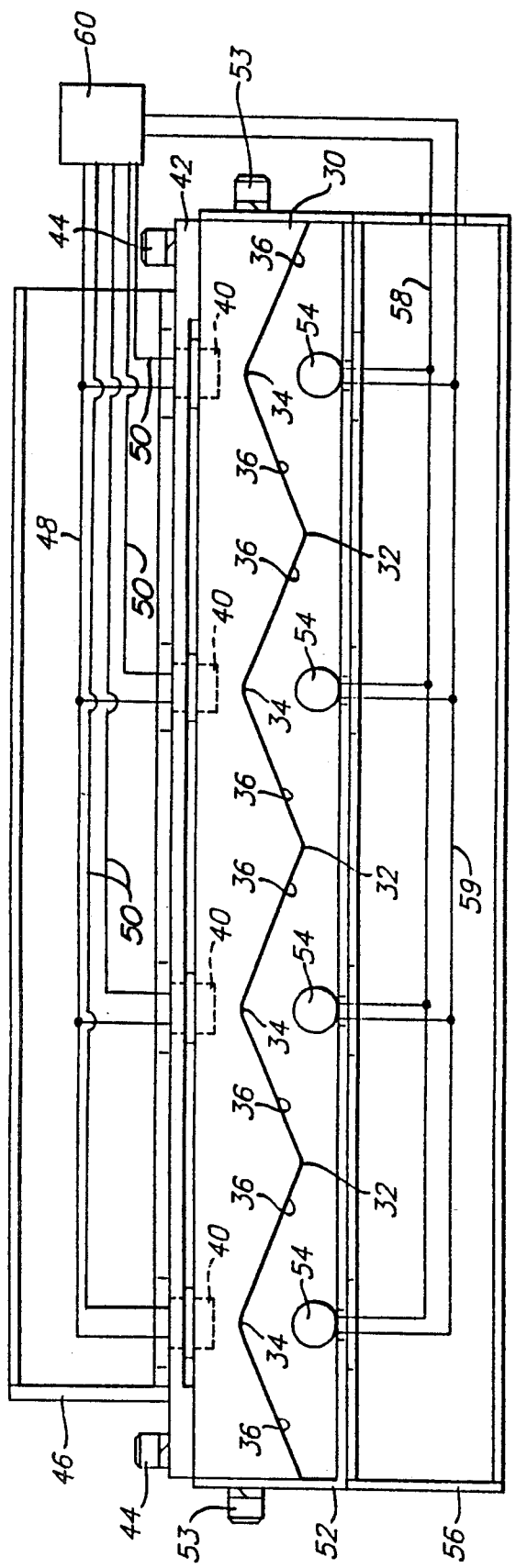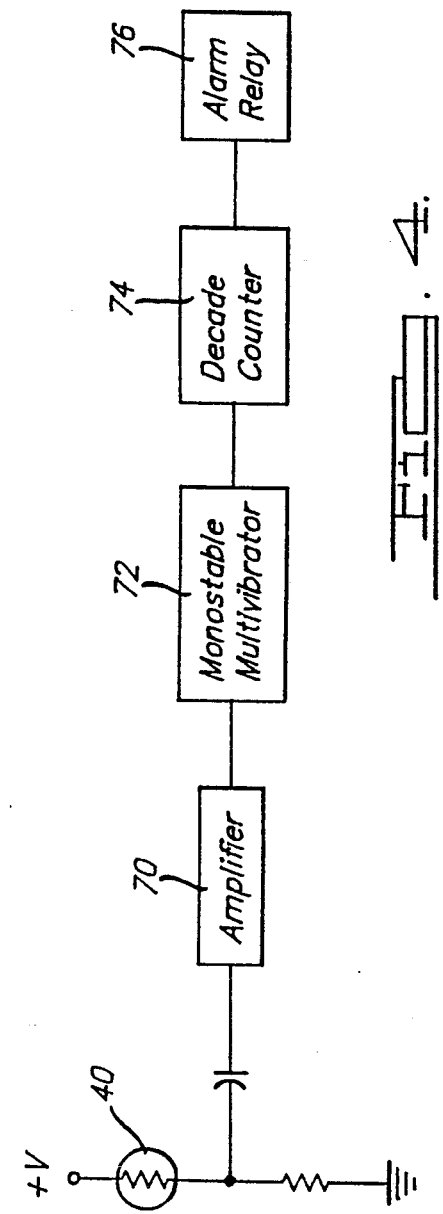

APPARATUS FOR LEAK TESTING A FLUID CONTAINING CHAMBER UTILIZING A LASER BEAM

CROSS REFERENCE TO RELATED APPLICATION

This application is a continuation-in-part application of application Ser. No. 07/338,622 filed Apr. 17, 1989, U.S. Pat. No. 4,924,694, which is a continuation in part of application Ser. No. 07/234,805 filed Aug. 22, 1988 entitled Method And Apparatus For Leak Testing A Fluid Containing Chamber now U.S. Pat. No. 4,854,158, issued Aug. 8, 1989.

BACKGROUND OF THE INVENTION

This invention relates to a leak detection apparatus and more particularly to an automated means for detecting leaks via liquid immersion testing.

Numerous components are manufactured which must meet a standard for a "leak tightness". Leak tightness is a relative term, as nothing can ever by completely free of leakage. A balance must be made between the increasing cost of finding smaller and smaller leaks and their importance to the functioning of the unit over its useful life. Leak tightness is the practical leakage that is acceptable under normal operating circumstances.

Components which require some degree of leak tightness, for example, include fuel tanks, radiators, fuel system components, water pumps, refrigeration components, heater cores, torque convertors, hydraulic and pneumatic components etc. The acceptable leakage will depend upon the usage of the component with respect to the type of fluid which must be contained, i.e. a gas or a liquid, and whether or not the contents will be pressurized.

Several leak detection methods are commonly used in industry. Each method has its own advantages, limitations and sensitivity range. As a result, not all methods are useful for every application The correct choice of the leak detection method should optimize cost, sensitivity and reliability of the test.

Liquid immersion testing is one of the oldest documented methods used to detect leaks. Liquid immersion testing operates on the basis of a differential pressure at the leak creating a flow of a gas from within the component to the liquid outside The part being tested is pressurized with a gas and then immersed in a liquid medium, generally water. The gas escaping the pressurized component produces one or more bubbles in the liquid which then rise to the surface of the water. The component being tested is allowed to remain in the liquid for a period of time while the liquid test medium is examined for the presence of bubbles. The location of bubbles indicates the location of a leak and the frequency and size of the bubbles can be used to estimate the leakage rate.

Liquid immersion testing has several advantages which include, low equipment cost relative to other methods, location of the leak can be determined, the equipment can easily be made durable enough for factory floor applications, and various size and shape components can be tested utilizing one test apparatus.

The primary disadvantage with liquid immersion testing is the requirement of an operator to visually inspect the water for bubbles of leaking gas. This adds subjectivity to the test and, in addition, research has shown that an operator's ability to accurately identify leaks decreases during the course of a typical eight hour work shift.

Accordingly, it is an object of this invention to provide a liquid immersion leak testing apparatus which includes an automatic means for detecting the presence of bubbles of gas leaking from the component being tested.

It is an advantage of this invention that a low cost liquid immersion testing apparatus can be equipped with an automatic sensing means which provides increased accuracy in detecting leaks without significantly increasing the cost of the device.

SUMMARY OF THE INVENTION

The leak detection apparatus of this invention employs a tank for submerging the component to be tested in a liquid test medium, typically water. Other liquids may be used as long as they are compatible with the test apparatus and the component being tested. Automatic identification of bubbles is accomplished by using a photoelectric detector such as the Clairex CL-703L photocell. To provide complete coverage of the surface area above the component being tested, a plastic channeling device is used to direct the bubbles rising int he liquid along a predetermined path which passes beneath the photocell.

It is contemplated that the channeling device be constructed of a transparent plastic material such as acrylic which on its lower side has a plurality of ridges and grooves extending longitudinally of the acrylic panel. The panel is positioned in the liquid above the component being tested and is inclined along its length such that bubbles rising from the component will impact the acrylic panel, move upward to one of the grooves in the underside of the panel and travel along the groove to the upwardly inclined end of the acrylic panel. A significant advantage of the described panel over funneling devices is that the required depth of water over the test part is greatly reduced. This is a major consideration for larger parts such as fuel tanks. A photocell is positioned above each groove at the upper end of the panel. Alternatively, a fiber optic cable can be couple to the channeling device above each groove which extends to a photocell positioned above the water level.

The number of photocells used can range from two or three to as many as fifteen to provide coverage to the entire component being tested. By increasing the number of photocells, the corresponding area of the component being tested by each detector is reduced, thereby increasing the accuracy of leak localization.

An electrical circuit, which may or may not include a computer, can be used to count the number of bubbles detected by the photocells and a fault signal can be activated when the number of bubbles counted exceeds a predetermined number, thereby indicating a leaking component.

The system can detect gross leaks to very small leaks having a leakage rate of $10^{-4}$ cc/sec. The test time must be increased as sensitivity is increased to allow a bubble to be formed which is large enough to overcome the surface tension holding the bubble to the component surface. Surface tension can be reduced approximately 50% by automatic addition of 0.01% of a suitable wetting agent such as GAF Chemical Corp. CO-630. The rate of bubble emission will then be increased up to 10 times.

It is another embodiment, the bubble channeling device is positioned horizontally in the water tank instead of being inclined. A slot extending through the channeling device is formed in each groove for the bubbles to pass through rather than traveling to the upper end of the channel before passing upward through a hole in the channeling device. A low power laser beam is projected through the slot or immediately above the slot and is interrupted by bubbles passing through the slot to detect the bubbles.

Further objects, features and advantages of the invention will become apparent from a consideration of the following description and the appended claims when taken in connection with the accompanying drawings.

BRIEF DESCRIPTION OF THE DRAWINGS

FIG. 2 is an end view as seen in the direction of arrow 2 of the channeling device used to direct the bubbles past the photocells;

FIG. 4 is a schematic of the electrical circuit used to count the bubbles and activate the fault signal;

FIG. 6 is a side elevation view of a portion of the apparatus of FIG. 1 in which the tank is sealed and air pressure in the tank above the water is reduced to a subatmospheric level;

DETAILED DESCRIPTION OF THE INVENTION

Figure 1:
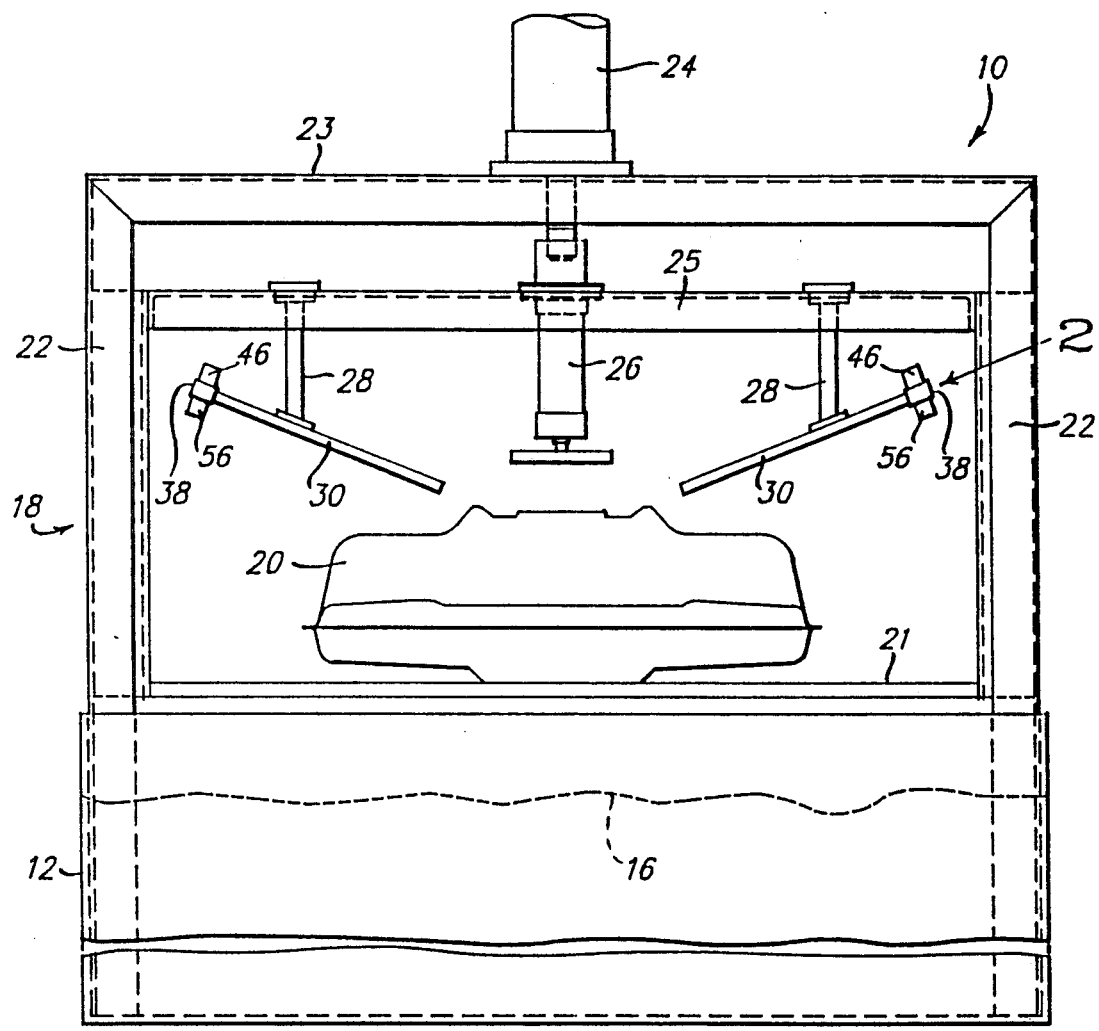
FIG. 1 is a side elevation view of a immersion leak test apparatus employing photocells to automatically detect the presence of bubbles according to this invention.

With reference to the drawings, an automated liquid immersion leak test apparatus 10 is illustrated in FIG. 1. The leak test apparatus includes a liquid holding tank 12 which contains a quantity of water to a level indicated at 16.

Positioned above the water holding tank 12 is a cage like test fixture 18 which is used for lowering and raising a component 20, in this case a fuel tank, into and out of the water in the holding tank 12. The fixture 18 includes a base support member 21 upon which the fuel tank is positioned, vertical frame members 22 and an upper cross member 23. Extending upward from the cross member 23 is a support cylinder 24 which is used for raising and lowering the fixture 18 into and out of the water.

Positioned below the upper cross member 23 is an intermediate cross member 25 which supports a cylinder 26 for sealing the fuel sender opening in the top surface of the fuel tank. Another cylinder (not shown) is used for sealing the fuel filler neck opening of the fuel tank. In addition, one or more other cylinders may be required for holding the fuel tank down against the base member 21 while conducting the test. Cylinder 26, in addition to sealing the fuel sender opening, also includes a conduit for providing air pressure to the interior of the fuel tank once it is submerged in the water. The component 20 can be either manually or automatically positioned on the base 21 when the fixture 18 is in the raised position as shown in FIG. 1.

Also extending downward from the intermediate cross member 25 are support brackets 28 which support acrylic panels 30 inclined relative to horizontal. Panels 30 are used to deflect any bubbles of air rising from the fuel tank past one of a plurality of photocells positioned at the upper end of the acrylic panels 30 as will be discussed in detail below. The panels 30 are shown in a position in which only a portion of the welded seam of the fuel tank is being tested for leaks. Additional panels 30 and photocells can be positioned over other areas of the fuel tank 20 to provide leak testing of additional portions of the fuel tank.

FIG. 2 is a view in the direction of arrow 2 of FIG. 1 and illustrates the detail of the upper end 38 of the panels 30. The bottom surface of the acrylic panel 30 is corrugated to form a plurality of evenly spaced ridges 32 and grooves 34 having flat inclined surfaces 36 extending between each ridge and groove. The ridges are spaced approximately two inches from each other for small parts and 3 inches from each other for large parts. However, smaller or larger spacing can be employed. At the grooves 34, the surfaces 36 do not form a sharp corner but form a curved transition having a radius of approximately ¼ inch. The angle between adjacent surfaces 36 is approximately 135°. The angle of inclination of the panel 30 in the water is approximately 2020 -30°. The angle of the panel 30 must be large enough to allow the bubbles to continuing rising in the grooves 34. However, as this angle is increased, the depth of the tank 12 must also be increased to enable complete submerging of the panel 30 in the tank unless multiple panels and sensors are used.

The bottom surface of the panel 30 must have a proper surface finish to prevent bubbles from sticking to the panel. The surface must permit "wetting" or the formation of a film of water when the panel is out of the water. A surface that will not "wet" will form droplets of water on its surface as opposed to a water film. A smooth acrylic panel will not "wet". When an air bubble contacts a smooth panel, the bubble will displace all water between the bubble and the smooth surface such that surface tension of the bubble will hold the bubble to the panel and prevent it from rising upward.

To ensure "wetting" of the panel 30, the bottom surface is finished by sanding with an 80 grit sand paper in a swirl pattern or fine sandblasting with 220-240 grit sand at 100 psi. The resultant surface is similar to frosted glass. If the surface is too rough, however, bubble movement can also be impeded. Alternative methods for surface treatment are light shot blast or painting with latex paint.

Above each groove 34, near the upper end 38 of the acrylic panel 30, is a photocell 40 shown in FIG. 2. Photocells 40 are placed in small holes in the upper surface of the acrylic panel 30. A photocell retaining plate 42 above photocells 40 holds the photocells in position and is secured to the plexiglas panel by screws 44. A photocell cover 46 is attached to the upper surface of the retaining plate 42. Photocell cover 46 is a plexiglas tubing through which extends the lead wires 48 and 50 to the photocells 40. The lead wires are encapsulated in a RTV rubber or a like compound which fills the interior of the photocell cover 46.

Extending below the acrylic panel 30 directly below the photocells 40, is a sheet metal light bulb bracket 52. Bracket 52 is attached to the sides of the panel 30 by screws 53. Positioned directly below each photocell is a light bulb 54 in a socket secured to the bracket 52. Light bulbs 54 can be incandescent lights or light emitting diodes. These lights 54 are used to provide light which is directed into the photocells 40 for aiding in detection of bubbles by the photocells. Extending below the bracket 52 is a wire conduit 56 made of plexiglas tubing. Lead wires 58 and 59 for the lights 54 are carried through the conduit 56 which is also filled with a RTV compound encapsulating the wires 58 and 59 within the conduit 56.

The electrical connections to the lights 54 and the photocells 40 are all water tight The photocells are hermetically sealed in glass. The lead wires 48, 50, 58 and 59 are all connected to a water tight electrical connector 60. Connector 60 is in turn connected to the control circuit for the leak detection apparatus.

Figure 3:
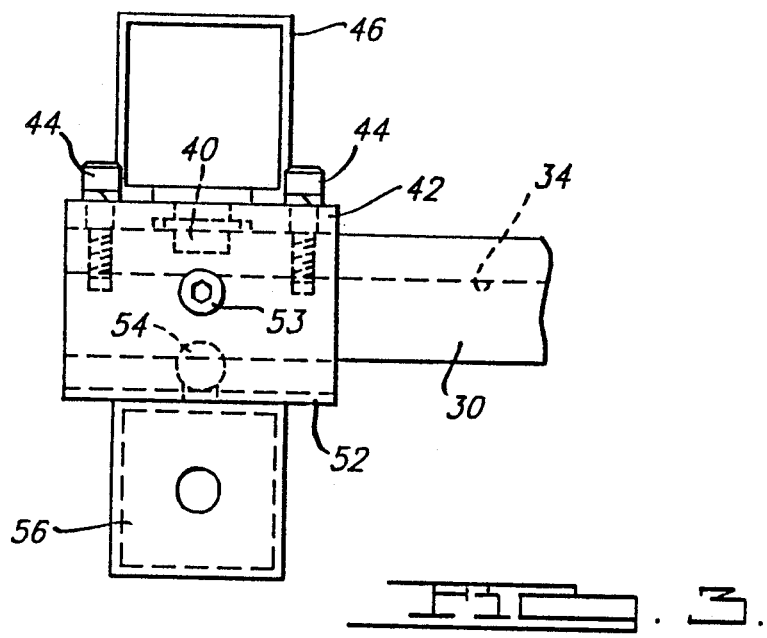
FIG. 3 is an enlarged side view of the upper end of the channeling device.

A side view of the upper end of the panel 30 is shown in FIG. 3.

A bubble of air leaking from the component 20 will rise in the water until it contacts the bottom side of the panel 30. Once the bubble contacts the panel 30, it will rise along a surface 36 until it reaches a groove 34. Once in groove 34, the bubble will continue to rise through the groove until it reaches the upper end 38 of the panel 30, from there the bubble will rise to the surface of the water. As the bubble rises through the groove 34, it will pass between a photocell 40 and light 54, interrupting the light directed toward the photocell such that the bubble will be detected by the photocell 40.

A schematic of the electric circuit for operation of the photocells provided in FIG. 4. The electrical signal produced by a photocell is first amplified by amplifier 70. The amplified signal then activates a monostable multi-vibrator 72 which produces a timed pulse of 0.5 seconds or less in response to a bubble detected by photocell 40. The timed pulse from the multi-vibrator 72, which can be programmed for periods other than a half second, activates a decade counter 74. When the number of pulses counted by the decade counter exceeds a predetermined value, an alarm relay will be activated thereby indicating a leak in the component being tested. An amplifier, multi-vibrator and counter are provided for each photocell 40 with the pulse generated by each of the multi-vibrators being fed to the associated decade counter for counting the total number of bubbles detected.

Depending on the sophistication required for the leak testing, a computer can be used in place of the decade counter for counting the number of bubbles. An advantage of either a computer or multiple decade counters is the capability of discriminating between random air bubbles which may have formed on the outside of the component as the component was being submerged, referred to as attached bubbles, and bubbles indicating a leak. For example, assume that it has been determined that five bubbles rising from a component indicate a leak. A single decade counter will indicate a leak once five bubbles have been counted. However, a single decade counter is not able to discriminate between attached bubbles and leak bubbles.

Attached bubbles will rise from random locations on the component surface. Leak bubbles on the other hand, are formed at the same location on the component surface. The bubbles from a leak will be detected by a single photocell 40 or by two or three adjacent photocells. Small currents in the water may cause bubbles originating from the same leak to be sensed by different photocells.

With a computer or multiple decade counters instead of a single decade counter, each photocell can be monitored to determine the number of bubbles detected by each photocell rather than merely sum the total number of bubbles detected by all photocells with the decade counter.

The computer can be programmed to add the bubbles detected from a set of two or more photocells positioned above adjacent grooves 34 in the panel 30. When the total bubble count for a set exceeds a predetermined number, for example 5, this would indicate a leak and an alarm would be activated, rejecting the component being tested.

An example is shown in Table I of how these sets can be arranged and a possible scenario for the bubbles counted in each set. In this example, one panel 30, having ten grooves 34 and photocells 40 is used to test the component. Eight sets of three adjacent photocells are formed. Set one is comprised of cells 1, 2, and 3. Set two is comprised of cells 2, 3, and 4, etc. The sets are overlapping in that, except for the cells at the edge of the panel, each cell is in three different sets.

TABLE 1

| SET | PHOTOCELLS | BUBBLE COUNT |
| --- | --- | --- |
| 1 | 1, 2, 3 | 1 |
| 2 | 2, 3, 4 | 3 |
| 3 | 3, 4, 5 | 5 Reject |
| 4 | 4, 5, 6 | 4 |
| 5 | 5, 6, 7 | 3 |
| 6 | 6, 7, 8 | 1 |
| 7 | 7, 8, 9 | 1 |
| 8 | 8, 9, 10 | 1 |

In this example, the number of bubbles counted by the photocells in set three has reached the predetermined number of five, whereby a leak is indicated and the fault signal is activated. In this manner, the apparatus can discriminate between five bubbles originating from random sources on the component surface and five bubbles that are originating from approximately the same location. It is necessary to combine the bubbles counted in adjacent grooves as currents in the water tank may cause bubbles originating from the same location to be directed to adjacent grooves as opposed to the same groove.

The computer can also be used to record the location of leaks in several components tested over a period of time which can be used to determine deficiencies in the manufacturing process of the component. Data regarding the number of parts tested, accept-reject percentages, frequency of leakage by location and other data can also be generated by the computer.

Figure 5:
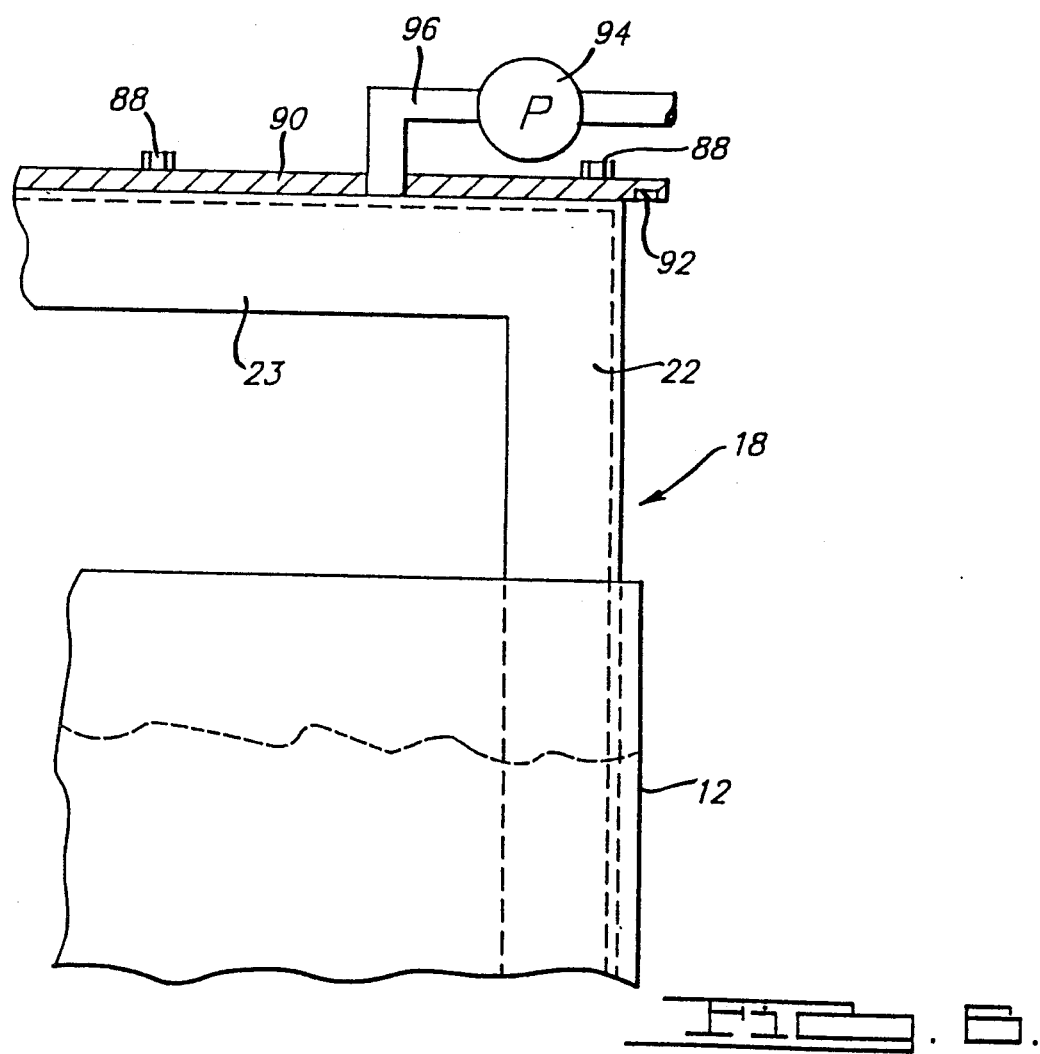
FIG. 5 is a schematic of a alternative circuit to count bubbles which discriminates between attached bubbles formed when the component is submerged and leak bubbles.
Figure 5:
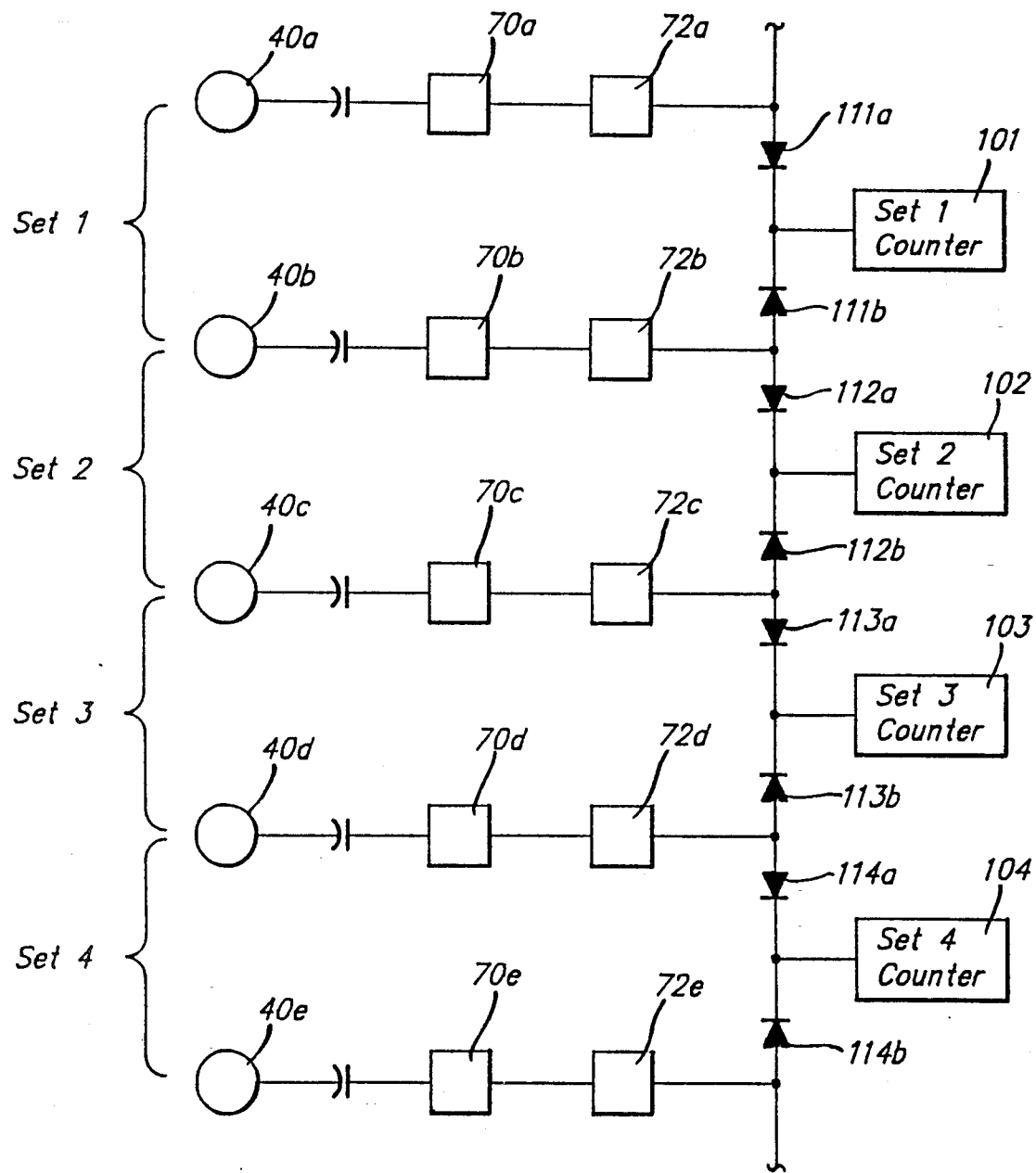

An alternative electrical circuit is shown in FIG. 5 which utilizes multiple decade counters instead of a computer to discriminate between attached bubbles and leak bubbles. In FIG. 5, sets are formed by two adjacent photocells as opposed to three as discussed above. The outputs of each of the monostable multi-vibrators 72 are fed to two decade counters. For example, the output from multi-vibrator 72b is fed to counters 101 and 102, the output from multi-vibrator 72C is fed to counters 102 and 103, etc.

In this manner, the bubbles sensed by photocells 40b and 40c are counted by counter 102, the bubbles sensed by photocells 40c and 40d are counted by counter 103, etc. Diodes 111-114 are used to prevent more than two adjacent counters from counting a single bubble. Although the number of photocells in each set in this example is two, the sets can be formed by more than two photocells by adding more leads from the multi-vibrators to additional counters.

Discrimination between attached bubbles and leak bubbles is thus accomplished without the requirement of a computer. The circuit of FIG. 5, unlike the computer, does not provide for data collection as previously described.

In operation, the component is tested by first sealing the openings, for example sealing the fuel filler pipe opening and the fuel sender opening in the tank 20 and then pressurizing the component. The component is retained in a fixture which is then submerged in the water in the tank 12. The bracket 28 with the panel 30 is supported in the water by the fixture above the tank 20.

After lowering the fixture in the water, a time delay of approximately eight seconds is allowed to elapse before beginning the test. The delay is to allow attached bubbles which were formed as the fixture was submerged to rise to the water surface. During this eight second delay, the computer or the machine programmable controller can preform a system self check to determine if each photocell 40 is functioning. To perform this self check, the lights 54 dimmed the same number of times as the pre-set bubble count to reject. If one or more of the system components are not functioning properly, an appropriate indicator will be activated and the testing operation stopped. After performing the self check and waiting for the eight second delay, the leak test is initiated and the space below each photocell 40 is searched for the presence of bubbles.

The length of the test depends upon the required sensitivity of the leak test and the use of a surface tension reducing agent. The smaller the allowable leak, the longer the test must be conducted. The smaller the leak, the longer the time necessary for enough gas to leak from the component to form a bubble large enough to overcome the surface tension holding the bubble to the component surface and allow it to rise to the water surface. Once the test has been completed, the fixture 18 is removed from the tank 12 allowing access to the component for removal and transfer to the appropriate location for either an accepted or rejected component.

The rate of bubble emission from a leak can be increased by creating a partial vacuum in the tank above the water surface. This will reduce the time required to preform the test. This technique also permits testing of completely enclosed parts which trap atmospheric pressure. FIG. 6 illustrates a tank equipped for use with a vacuum.

A tank cover plate 90 is attached to the upper cross member 23 by bolts 88. A seal 92 is mounted to the lower surface of plate 90 at its periphery. Seal 92 seals against the top surface of tank 12 when the fixture 18 is completely lowered into the tank 12. Once sealed, a partial vacuum of from 6 to 25 inches hg is created in the tank by the vacuum pump 94 connected to the tank interior through conduit 96.

The test is then performed as described above. The vacuum results in an increased rate of bubble formation thereby reducing the time necessary for detecting a given leakage rate.

By automating the bubble detection in a liquid immersion leak test apparatus, the primary disadvantage to liquid immersion testing, operator subjectivity is eliminated. The advantages however, such as low cost, durability and adaptability to more than one component are still retained with the automated leak detection.

Figure 7:
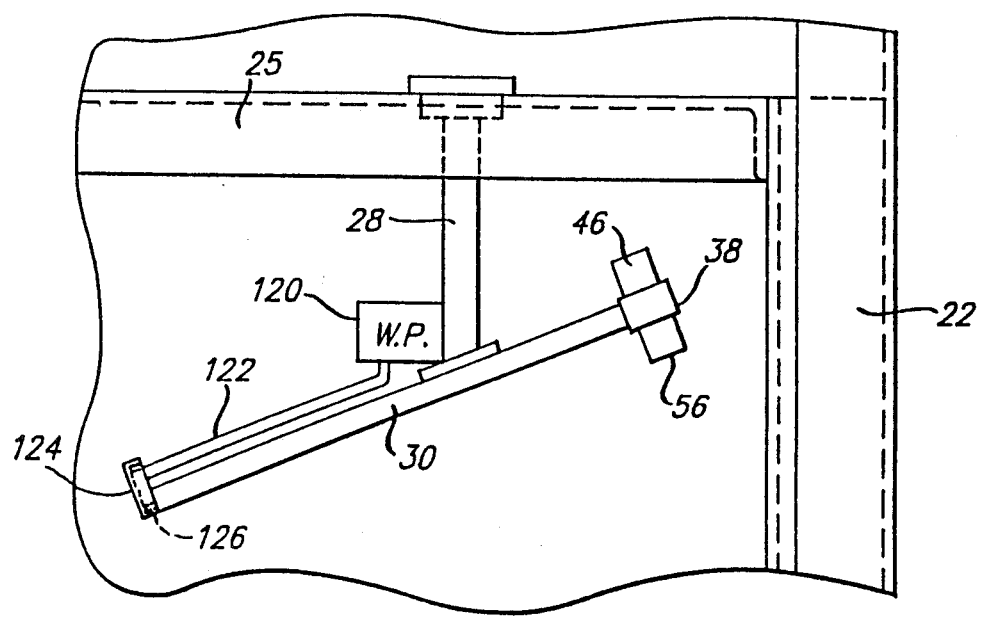
FIG. 7 is a fragmentary side elevational view of a modified form of the present invention.
Figure 8:
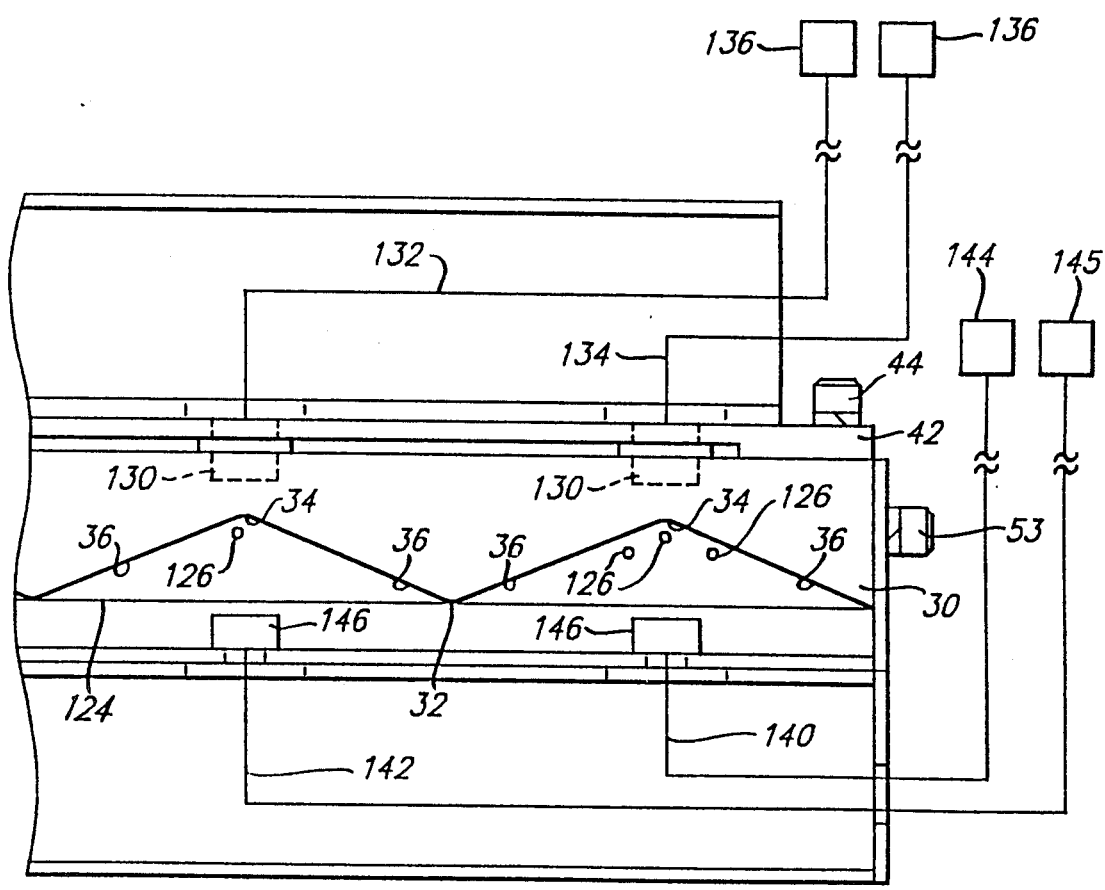
FIG. 8 is a fragmentary end view similar to FIG. 2 of a modified form of the present invention utilizing fiber optics.

Alternative embodiments of the invention are shown in FIGS. 7 and 8. It has been found that bubbles may stick to the bottom surface of the panel 30 even though the surface has been roughened. This is especially true if the water has collected oil from the parts being tested. To prevent bubble sticking, low pressure moderate flow water jets are positioned in each groove of the panel 30. These flow jets are shown in FIG. 7 in which a water pump 120 is used to pump water to the flow jets. A pipe 122 directs water from the pump 120 to a manifold 124 attached to the lower end of panel 30. The manifold has a plurality of outlets 126. Each groove of the panel 30 can have one or more outlets 126 as shown in FIG. 8 where the left groove 34 has one outlet 126 and the right groove has three outlets 126. The flowing water through the grooves 34, sweeps the bubbles off the panel surface. The water flow rate through the outlets 126 is less than half a gallon per minute. The water flow rate can be increased before and after a test so that any bubbles on the panel 30 can be swept off prior to the next test being initiated. The manifold 124 can be made of any lightweight material such as plastic or aluminum suitable for use in water.

It has also been found for some installations that it is not practical to use photocells underwater as described above. An alternative embodiment utilizing fiber optics is shown in FIG. 8. The photocells have been replaced with fiber optic connectors 130 connected to fiber optic cables 132 and 134. The connectors 130 receive light from light sources below the panel 30 and transmit the light through the fibers 132 and 134. The fiber optic cables are connected at their other ends to photocells or photodiodes 136 which convert the light to an electrical current. When a bubble passes between the light sources and the fiber optic connectors 130, the light transmission to the fiber optic connectors 130 is interrupted. This causes an interruption in the signal from photodiodes 136. These interruptions are then counted by the signal processing electronics as described above.

The light source beneath the panel 30 can also be supplied by fiber optics instead of the light bulbs 54 shown in FIG. 2. Fiber optic cables 140 and 142 supply light radiation from a light radiation source 144 and 145 out of the water to light transmitters 146 which project the light radiation upward, toward the grooves 34 in panel 30. Alternatively, a single light source is used in place of light sources 144 and 145, with the light being directed through both fiber optic cables 140 and 142.

When the light path from the transmitters 146 to the connectors 130 is interrupted by a bubble passing through a groove 34, an electrical signal is produced which is counted by the electric processing circuit or computer.

Figure 9:
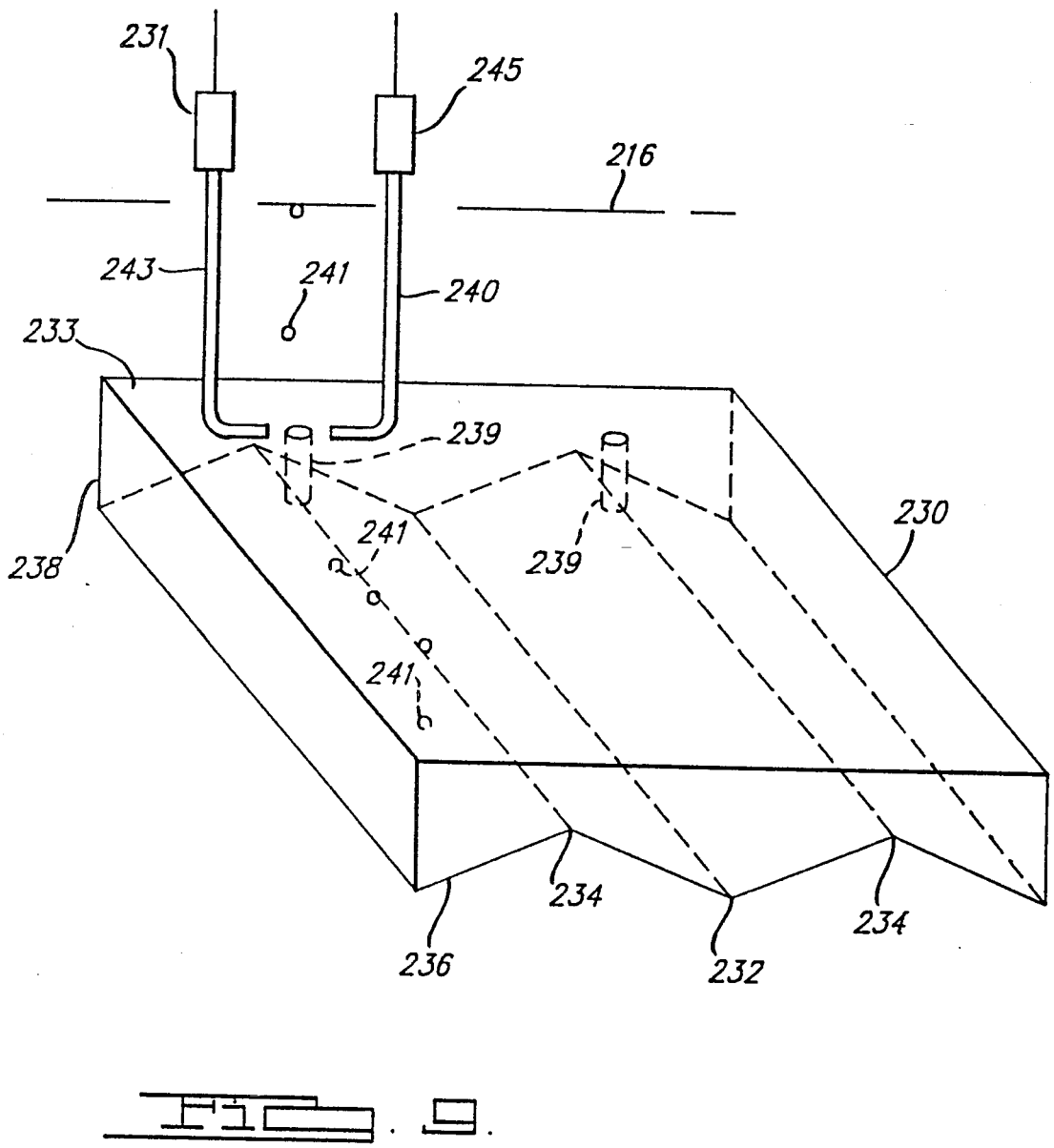
FIG. 9 is a perspective view of an alternative embodiment of the channeling device of the modified form of the present invention.

A modified form of the invention is shown in FIG. 9. A channeling device 230, similar to panel 30 of FIG. 1, has grooves 234 and ridges 232 along its lower surface connected by flat surfaces 236. Instead of allowing the bubbles 241 to travel upward along the grooves 234 to the upwardly inclined end 238 of the channeling device 230, holes 239 are machined through the panel near the upper end 245. The bubbles 241 travel upwardly through the holes 239 and up to the water level 216. As in the embodiment shown in FIG. 8, fiber optic cables are used to detect the presence of bubbles 241. A light source 245 positioned above the water produces light radiation which is directed through a fiber optic cable 240 to one side of the hole 239 at the top surface 233 of the panel 230. A second fiber optic cable 243 receives light radiation from the fiber optic cable 240 and directs it to a light detector 231 also positioned above the water level 216. When a bubble 241 rises through the hole 239 between the cables 240 and 243, the light radiation received by the light detector 231 is diminished by the bubble 241 and a signal is then produced by the light detector which is counted by the control circuit.

Figure 10:
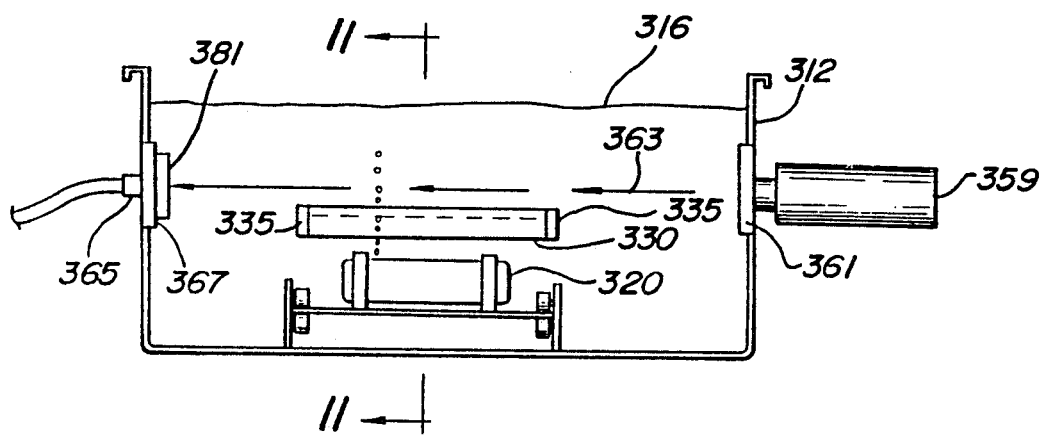
FIG. 10 is an elevational view of an alternative embodiment of the leak detection apparatus employing laser beams for detecting bubbles.
Figure 11:
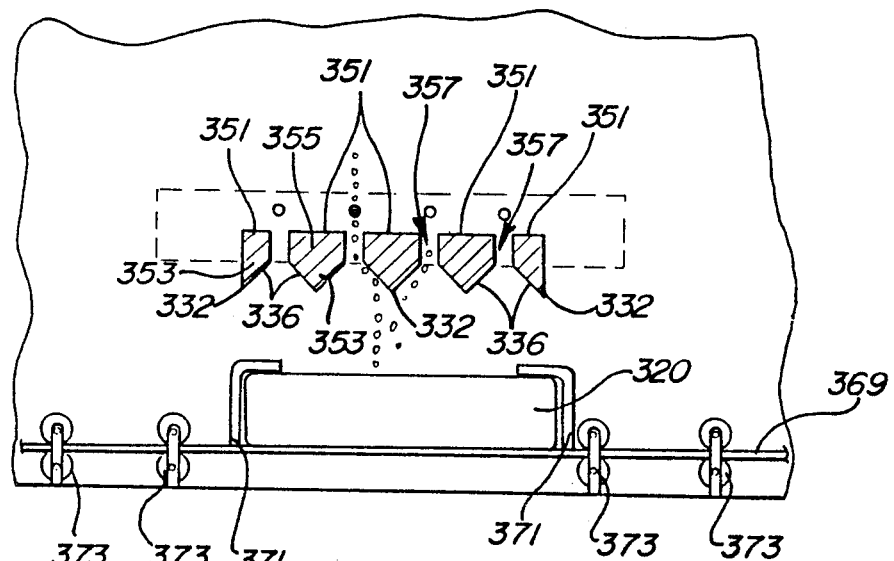
FIG. 11 is a sectional view as seen from substantially the line 11—11 of FIG. 10.

An alternative embodiment of the invention is shown in FIGS. 10–13 which employs a plurality of laser beams which are interrupted by the bubbles to detect the presence of the bubbles. In this embodiment, the bubble deflecting panel 330 is positioned horizontally within the water tank 312. The advantages resulting from a horizontal panel 330 will be described in detail below. The panel 330 as shown in FIG. 11 is constructed of a plurality of individual segments 351. Each segment includes a lower generally triangular portion 353 and an upper rectangular portion 355. The triangular portions are directed downward forming ridges 332. Each of the segments 351 are spaced from one another such that slots 357 between the segments extend across the panel 330.

A bubble of air from test component 320 will rise until it contacts an inclined surface 336 of the lower triangular portion of the segments. The bubble will then rise along surface 336, through slot 357 directly to the water surface 316. The surfaces 336 can be inclined at a relatively steep angle so as to avoid the previously mentioned concern of the bubbles sticking to the panel 330.

A laser 359 is mounted to the exterior of tank 312 adjacent to a transparent window 361 in the tank sidewall. Laser 359 projects a laser beam 363 through the window 361 and across the water tank immediately above each slot 357. A separate laser 359 can be used for each slot 357 or a multiple beam splitter can be used to provide a laser beam for each slot 357 from a single laser. The laser beams are 3 to 4 mm in diameter and are produced by a helium-neon laser. Preferably the laser is operated at a low enough energy that the laser beam will not damage a person's eye.

A plurality of photodiodes or other photosensors 365 are attached to the opposite side of tank 312 adjacent a second transparent window 367. A separate photodiode 365 is positioned across the tank from each laser beam 363. As a bubble rising to the surface from a slot 357 crosses a laser beam, the reception of the laser light by the photodiode 365 is interrupted momentarily, thereby indicating a bubble passing through the laser beam. As shown in FIG. 10, the laser beams 363 are projected across the top of the panel 330 rather than directly through the slots 357. The laser beams are positioned above the panel 330 so as to avoid interference from the end brackets 335 to which the panel segments 351 are attached. Depending upon the power of the laser and the sensitivity of the photodiodes 365 used to receive the laser beam, it may be necessary to filter the laser beam. This can be accomplished by a filter 381 positioned in front of the photodiodes 365.

Figure 12:
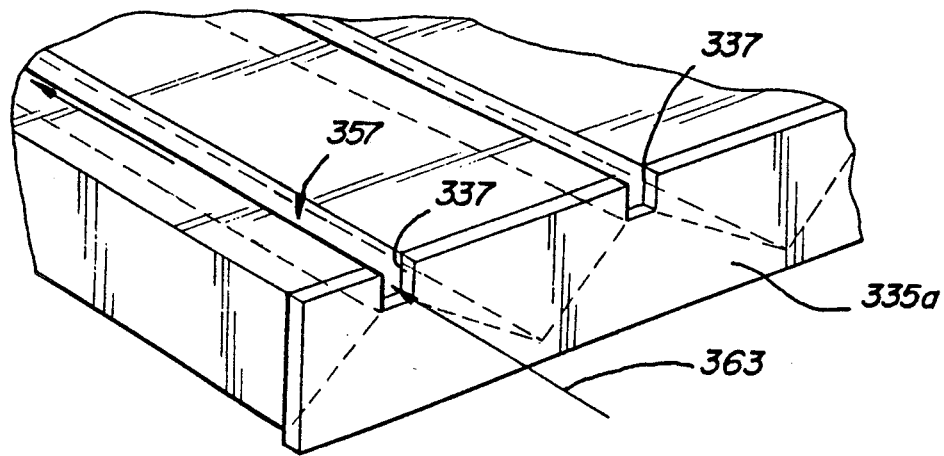
FIG. 12 is a fragmentary perspective view of the end of the bubble channeling device showing an alternative embodiment.

Alternatively, apertures can be provided in the end brackets 335 to enable the laser beams 363 to be projected through the slots 357. This alternative embodiment is shown in FIG. 12 in which the end bracket 335a includes a cut away 337 at each end of each slot 357 to enable the laser beam 363 to travel through the slot 357 as opposed to above the slot.

The spacing of the slots can range from 2 to 8 inches or more. As spacing is increased, the ability to determine the specific leak location is diminished. By reducing the spacing the number of lasers and photodiodes required is increased. A balancing of these two factors will determine the optimum slot spacing for a given application.

The panel 330 can be mounted to a movable fixture as is the panel 30 shown in FIG. 1 in which the part to be tested is loaded onto the fixture and submerged in the tank 12. Alternatively, the panel 330 can be permanently mounted in the tank and a belt or other conveying system can be used to move the part into position below the panel 330. Such a system is shown in FIGS. 10 and 11 employing a belt conveyor 369 having component mounting fixtures 371 to hold the component 320 in place. A plurality of roller assemblies 373 guide the belt 369 through the water. The motion of the belt is indexed such that it will stop with a component 320 below the panel 330 for a sufficient time to conduct the leak test.

The horizontal position of the panel 330 has two primary advantages over the inclined panels shown in FIGS. 1, 7, and 9. With an inclined panel, as the size of the component to be tested is increased, the depth of the tank must also be increased to provide sufficient depth for submerging the panel. This is necessary because the panel size must also increase to cover the component. In contrast, with the horizontal panel, the component size can be increased without effecting the required depth of the tank.

The other advantage is that the test cycle time is reduced. The bubbles no longer have to travel the length of the panel to pass the detecting means but merely rise along the inclined surface 336 to the slot 357 and then move directly up to the water surface. This reduces the bubble travel time by as much as ten seconds resulting in a significant increase in the test rate.

As with the previous embodiments, before each test the system performs a self check in which the laser is activated and the signal from the photodiodes 365 are checked to insure proper functioning of the system. If the water becomes dirty or cloudy, such that the laser beams cannot pass through the water, the system self-check will detect this condition and stop the test process.

Figure 13:
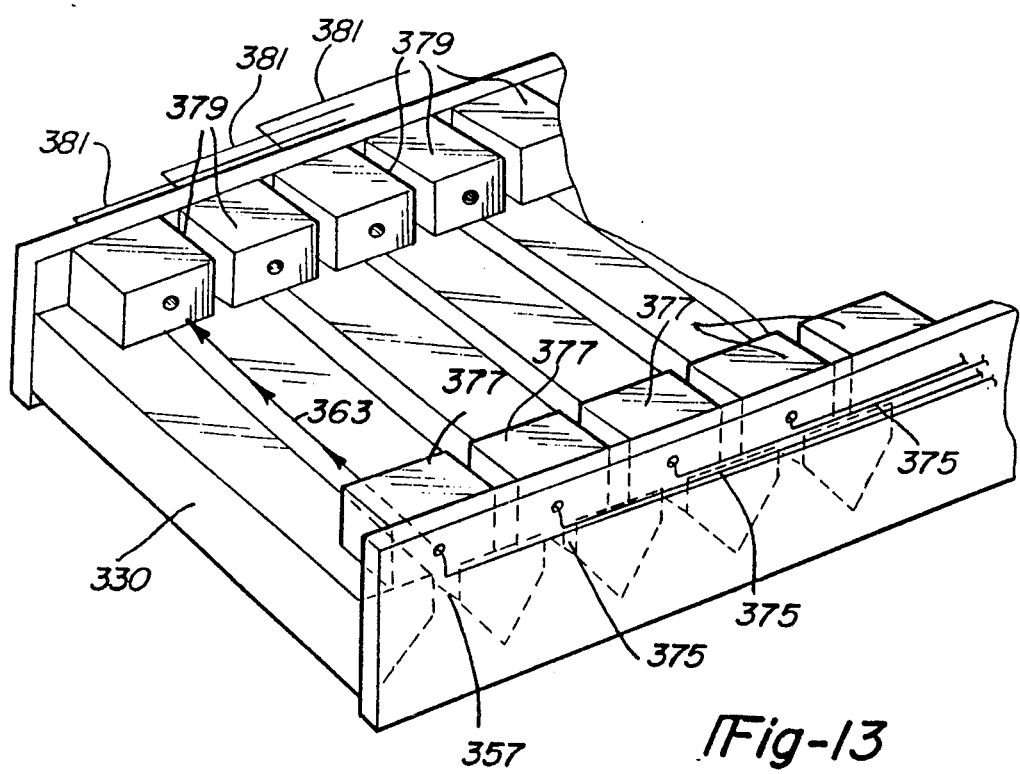
FIG. 13 is a perspective view of an alternative embodiment of the leak detection apparatus employing laser beams and fiber optic cables to transmit the laser beams.

An alternative laser beam embodiment is shown in FIG. 13 which employs fiber optic cables 375 to transmit the laser beam from a laser positioned outside of the tank to fiber optic retainers 377 positioned above each of the channels 357. The laser beam 363 is then projected across the top of panel 330. A laser beam detector 379 on the opposite side of the panel 330 detects the laser beam and is connected to fiber optic cables 381 that transmit the laser beam to the photodiodes 365.

This embodiment, although being somewhat more complex than the embodiment without the fiber optic cables, does offer the advantage of having a shorter travel of the laser beam 363 through the water. The earlier discussed advantages of the horizontal panel 330 are fully applicable to his embodiment as well.

The signal received from the test device is processed it eh same manner as discussed above in which the quantity of bubbles detected at one or more adjacent slots 357 are counted to detect a leak rather than the total number of bubbles counted by the entire system. This enables discrimination between "attached" bubbles rising from any location on the component surface versus leak bubbles originating at a single location on the component surface.

It is to be understood that the invention is not limited to the exact construction or method illustrated and described above, but that various changes and modifications may be made without departing for the spirit and scope of the invention as define din the following claims.

What is claimed is:

1. An apparatus for leak testing at least a portion of a fluid containing chamber by detecting bubbles of a gas rising from said portion when submerged in a liquid comprising:
    an elongated panel oriented generally horizontally in said liquid above said chamber for deflecting said bubbles past at least one predetermined elongated section;
    a light radiation source for projecting a beam of highly focused light along said predetermined elongated section;
    means disposed adjacent said predetermined elongated section opposite said light radiation source for receiving said beam of light, said receiving means producing a signal when said beam of light is interrupted by a bubble passing through said predetermined elongated section; and
    means for counting the number of said signals.

2. The apparatus of claim 1 having a plurality of predetermined elongated sections and wherein said receiving means is configured to determine which of said elongate sections a bubble has passed.

3. The apparatus of claim 2 wherein said light radiation source includes a laser source for each of said predetermined locations.

4. The apparatus of claim 3 wherein said receiving means includes photosensor means adjacent each of said predetermined locations opposite from said laser source.

5. The apparatus of claim 3 wherein said laser source includes at least one laser positioned out of said liquid.

6. The apparatus of claim 3 wherein said receiving means includes photosensor means positioned out of said liquid opposite said predetermined locations form said laser source.

7. The apparatus of claim 1 further comprising means for conveying said fluid containing chamber beneath said elongated panel.

8. The apparatus of claim 1 wherein said light radiation source is a laser.

9. The apparatus of claim 1 further comprising means for pressurizing said gas.

10. The apparatus of claim 1 further comprising means for reducing the ambient pressure above said liquid.

11. The apparatus of claim 1 wherein said panel permits wetting.

12. The apparatus of claim 11 wherein said panel comprises a sufficiently roughed surface sufficient to permit said wetting.

13. The apparatus of claim 11 wherein said panel is coated with a substance to permit said wetting.

14. The apparatus of claim 1 further comprising a source for said liquid and a pump connected to said source to create a flow of said liquid generally parallel to said elongated panel.

15. An apparatus for leak testing at least a portion of a fluid containing chamber by detecting bubbles of a gas rising from said portion when pressurized and submerged in a liquid comprising:
    means in said liquid above said chamber for deflecting said bubbles past one of a plurality of predetermined locations;
    laser means for projecting a separate laser beam across each of said predetermined locations;
    means disposed opposite said predetermined locations from said laser means for receiving said laser beams, said receiving means producing a signal when said laser beams are interrupted by bubbles passing said predetermined locations; and
    means for counting the number of said signals and indicating a leak when a predetermined number of interruptions have been counted.

16. The apparatus of claim 15 further comprising:
    means for adding the number of signals produced by said bubbles passing two or more adjacent predetermined locations; and
    means for indicating a leak from said chamber when the sum of said signals exceeds said predetermined number.

17. An apparatus for leak testing at least a portion of a fluid containing chamber by detecting bubbles of a gas rising from said portion when pressurized and submerged in a liquid comprising:
    means in said liquid above said chamber for deflecting said bubbles past one of a plurality of predetermined locations;
    said deflecting means including a panel having a corrugated surface of alternating parallel ridges and grooves extending in one direction along the bottom surface of said panel;
    said panel including an elongated slot vertically through the panel in each of said grooves extending substantially the length of said grooves, said slots enabling said bubbles to pass upwardly through said slots of the surface of said liquid;
    laser means for projecting a separate laser beam across each of said predetermined locations;
    means disposed opposite said predetermined locations from said laser means for receiving said laser means for receiving said laser beams, said receiving means producing a signal when said laser beams are interrupted by bubbles passing said predetermined locations; and
    means for counting the number of said signals and indicating a leak when a predetermined number of interruptions have been counted.

18. The apparatus of claim 17 wherein the space above said slots defines said predetermined locations, said laser beams being projected parallel to said slots above said panel so as to be interrupted by bubbles after passing through said slots.

19. The apparatus of claim 17 wherein said slots define said predetermined locations, said laser beams being projected through said slots so as to be interrupted by bubbles passing through said slots.

20. The apparatus of claim 17 wherein said panel is constructed of a plurality of elongated members having generally triangular shaped lower portions forming said ridges, aid members being parallel to one another and spaced from one another to form said slots therebetween, said triangular lower portions deflecting said bubbles to said slots as said bubbles rise in said liquid.

21. An apparatus for leak testing at least a portion of a fluid containing chamber by detecting bubbles of sa gas rising from said portion submerged in a body of a liquid, said apparatus comprising:

an elongated deflector in said liquid for guiding said bubbles past at least one predetermined location;

means for creating a flow of said liquid generally parallel to said elongated deflector;

a light radiation source for projecting a beam of light across said predetermined location;

means disposed adjacent said predetermined locations opposite said light radiation source for receiving said beam of light, said receiving means producing a signal when said beam of light is interrupted by a bubble passing said predetermined location; and means for registering said signals.

22. The apparatus of claim 21 wherein said light radiation source is a laser.

23. The apparatus of claim 21 wherein said predetermined location comprises an elongated location.

24. The apparatus of claim 21 further comprising means for reducing the ambient pressure above said liquid.

25. The apparatus of claim 21 wherein said means for creating a flow of said liquid comprises a pump submerged in said body of liquid.

* * * * *

UNITED STATES PATENT AND TRADEMARK OFFICE
CERTIFICATE OF CORRECTION

PATENT NO. : 5,263,361

DATED : November 23, 1993

INVENTOR(S) : Donald C. Gates

It is certified that error appears in the above-identified patent and that said Letters Patent is hereby corrected as shown below:

Column 2, line 25, "int he" should be --in the--.

Column 2, line 44, "couple" should be --coupled--.

Column 4, line 45, "2020" should be --20°--.

Column 8, line 63, "source" should be --sources--.

Column 11, line 10, "his" should be --this--.

Column 11, line 12, "it eh" should be --in the--.

Column 11, line 23, "for" should be --from--.

Column 11, line 24, "define din" should be --defined in--.

Column 11, line 48, claim 2, "elongate" should be --elongated--.

Column 11, line 60, claim 6, "form" should be --from--.

UNITED STATES PATENT AND TRADEMARK OFFICE
CERTIFICATE OF CORRECTION

PATENT NO. : 5,263,361

DATED : November 23, 1993

INVENTOR(S) : Donald C. Gates

It is certified that error appears in the above-identified patent and that said Letters Patent is hereby corrected as shown below:

Column 12, line 20, claim 15, insert --elongated-- before "predetermined".

Column 12, line 23, claim 15, insert --elongated-- before "predetermined".

Column 12, line 28, claim 15, insert --elongated-- before "predetermined".

Column 12, line 34, claim 16, insert --elongated-- before "predetermined".

Column 12, line 54, claim 17, "slots of" should be --slots to--.

Column 13, line 11, claim 20, "aid" should be --said--.

Column 13, line 17, claim 21, "sa" should be --a--.

Signed and Sealed this

Twenty-sixth Day of July, 1994

*Attest:*

BRUCE LEHMAN

*Attesting Officer*     Commissioner of Patents and Trademarks